US007925298B2

(12) United States Patent  (10) Patent No.: US 7,925,298 B2
Chen et al.  (45) Date of Patent: Apr. 12, 2011

(54) USER INTERFACE FOR A SECONDARY DISPLAY MODULE OF A MOBILE ELECTRONIC DEVICE

(75) Inventors: Chao-Chi Chen, Sammamish, WA (US); Martin J. Kee, Sammamish, WA (US); Craig W. O'Connell, Snohomish, WA (US); Anne Aileen Armstrong, Seattle, WA (US); Stephen L. Perrin, Lake Forest Park, WA (US)

(73) Assignee: Vulcan Portals Inc., Seattle, WA (US)

( * ) Notice: Subject to any disclaimer, the term of this patent is extended or adjusted under 35 U.S.C. 154(b) by 0 days.

(21) Appl. No.: 10/870,480

(22) Filed: Jun. 17, 2004

(65) Prior Publication Data
US 2005/0064911 A1  Mar. 24, 2005

Related U.S. Application Data

(60) Provisional application No. 60/504,165, filed on Sep. 18, 2003.

(51) Int. Cl.
*H04M 1/00* (2006.01)
*H04B 1/38* (2006.01)
*G06F 3/02* (2006.01)
*G06F 1/00* (2006.01)
*G09G 5/00* (2006.01)

(52) U.S. Cl. ............... 455/556.1; 455/550.1; 455/575.1; 455/575.3; 455/574; 345/169; 713/323; 713/324

(58) Field of Classification Search .................. 455/566, 455/574, 343.1, 556.1, 550.1, 575.3; 345/1.1, 345/1.2, 156, 157, 163, 169; 713/300, 310, 713/321, 322, 323, 324, 330, 340
See application file for complete search history.

(56) References Cited

U.S. PATENT DOCUMENTS
5,768,164 A * 6/1998 Hollon, Jr. .................... 708/174
(Continued)

FOREIGN PATENT DOCUMENTS
DE  199 52 486 A1  5/2001
(Continued)

OTHER PUBLICATIONS

Translated copy of the Taiwanese Office Action mailed Jan. 27, 2011 for Taiwanese Patent Application No. 93128335, a counterpart foreign application of U.S. Appl. No. 10/870,480.

*Primary Examiner* — George Eng
*Assistant Examiner* — Wesley L Kim
(74) *Attorney, Agent, or Firm* — Lee & Hayes, PLLC (57) ABSTRACT

A user interface (UI) for use with a secondary display module of a mobile electronic device. The UI allows the user to access application data without activating the operating system (OS) of the main portion of the mobile electronic device. The UI can allow the user to access application data by activating the OS and an associated low-power application without launching the application. The UI also provides a simple mechanism to disable wireless components of the mobile electronic device while allowing the user to use other non-wireless components. The secondary display module can be detached from a main portion of the mobile electronic device, with the UI being automatically activated. The UI can be automatically activated (or deactivated) in response to deactivation (or activation) of the UI of the main display of the mobile electronic device.

43 Claims, 9 Drawing Sheets

U.S. PATENT DOCUMENTS

| | | | |
|---|---|---|---|
| 7,240,228 B2 * | 7/2007 | Bear et al. | 713/320 |
| 7,406,610 B2 * | 7/2008 | Kardach et al. | 713/300 |
| 2001/0011029 A1 * | 8/2001 | Iwabuchi et al. | 455/566 |
| 2002/0086719 A1 * | 7/2002 | Kedia et al. | 455/574 |
| 2002/0087225 A1 * | 7/2002 | Howard | 700/94 |
| 2002/0137551 A1 * | 9/2002 | Toba | 455/566 |
| 2002/0173301 A1 * | 11/2002 | Ikeda | 455/419 |
| 2002/0198029 A1 * | 12/2002 | Tenhunen et al. | 455/566 |
| 2003/0126335 A1 * | 7/2003 | Silvester | 710/303 |
| 2006/0284787 A1 * | 12/2006 | Bear et al. | 345/1.1 |

FOREIGN PATENT DOCUMENTS

| | | |
|---|---|---|
| EP | 0 776 115 A1 | 5/1997 |
| EP | 0 810 510 A1 | 12/1997 |
| JP | 2003143264 | 5/2003 |
| JP | 2003218998 | 7/2003 |
| WO | WO 03/029943 A1 | 4/2003 |

* cited by examiner

USER INTERFACE FOR A SECONDARY DISPLAY MODULE OF A MOBILE ELECTRONIC DEVICE

CROSS-REFERENCE TO RELATED APPLICATIONS

This application claims benefit of U.S. Provisional Application No. 60/504,165 entitled "SOFTWARE AND HARDWARE FEATURES FOR MINI-PC", filed Sep. 18, 2003, which is incorporated herein by reference.

FIELD

The present disclosure relates generally to electronic devices and, more particularly but not exclusively to user interfaces for use on secondary display modules of a mobile electronic device, such as a hand-held portable computer.

BACKGROUND

Mobile electronic devices typically include a display to present a user interface (UI) that provides visual information to a user. The UI also generally allows the user to input control and data information to the mobile electronic device. For example, cellular telephones (one type of mobile electronic device) typically have a liquid crystal display (LCD) and a keypad to present a UI that allows the user to make telephone calls, store telephone numbers, find stored phone numbers etc.

Some mobile electronic devices have a "clamshell" design in which the mobile electronic device is separated into two portions attached by a hinge mechanism so that the device can be "opened" and "closed". In a typical clamshell design, one portion contains the display and the other contains a keypad. When open, the display and keypad are visible to the user. When closed, the display and keypad are typically positioned to face each other so that they are somewhat protected from the environment and not visible to the user.

In some clamshell designs, the mobile electronic device includes a secondary display that is visible to the user when the mobile electronic device is closed. This secondary display typically has limited functionality. For example, in a clamshell type cellular telephone the time and date may be shown on the secondary display or, when receiving a telephone call, the cellular telephone may show the name or telephone number of the caller on the secondary display. In a typical design, a cellular telephone does not provide a UI on the secondary display.

Further, mobile electronic devices are typically battery-powered. Consequently, power conservation is an important design consideration.

SUMMARY

In accordance with aspects of the various embodiments, a UI is provided for use with a secondary display module of a mobile electronic device having a main display. In one aspect, the secondary display module UI allows a user to access application data (e.g. email messages) without activating the system resources (such as the central processing unit, networking device, operating system, etc.) of the mobile electronic device, which helps to conserve power in some embodiments.

In another aspect, selected "full" applications residing in the mobile electronic device have associated low-power applications that are optimized to provide information to be displayed in the secondary display module UI (which provides functions that are more simplified than those provided by the UI used with the main display). The secondary display module UI allows the user to access application data using an associated low-power application without launching the full application, which helps to conserve power in some embodiments.

In yet another aspect, the UI of the secondary display module provides a simple mechanism to turn off or disable wireless components of the mobile electronic device. This aspect can advantageously allow a user to easily and quickly turn off wireless communication components of the mobile electronic device when in an airplane as typically required when the airplane is in the air. In a further refinement, the wireless portions can be disabled when the mobile electronic device is turned on thereby allowing the user to use the mobile electronic device while other non-wireless components are operating.

In still another aspect, the secondary display module can be detached from a main portion of the mobile electronic device, with the UI of the secondary display module being automatically activated. In a further refinement of this aspect, the UI can be automatically reoriented (e.g. from a "landscape" to "portrait" orientation) on the display of the secondary display module. In a related aspect, the UI of the secondary display module can be automatically activated (or deactivated) in response to deactivation (or activation) of the UI of the main display of the mobile electronic device.

DETAILED DESCRIPTION OF PREFERRED EMBODIMENTS

Figure 1:
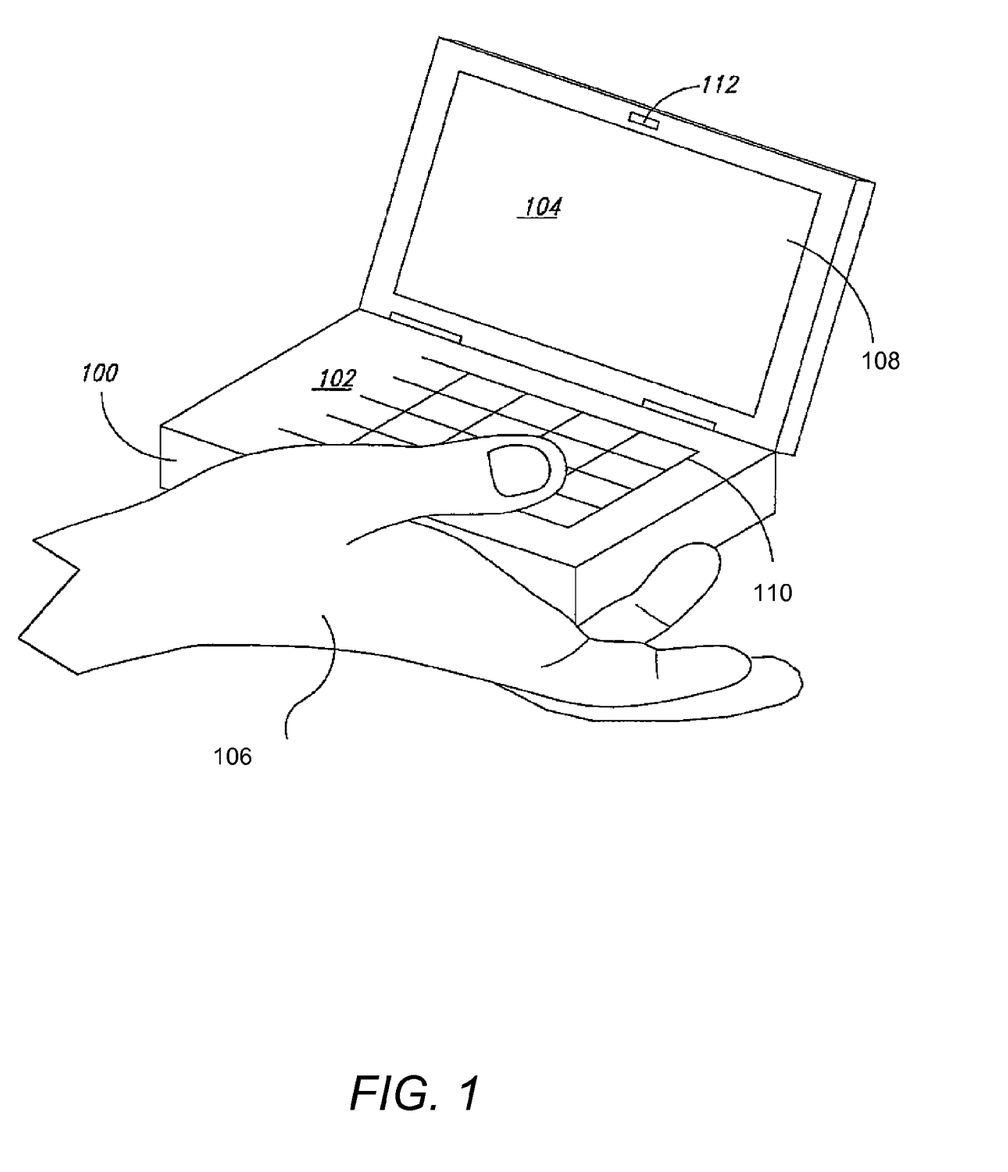
FIG. 1 is a perspective view of a mobile electronic device while open, with the main display visible to a user.
Figure 2:
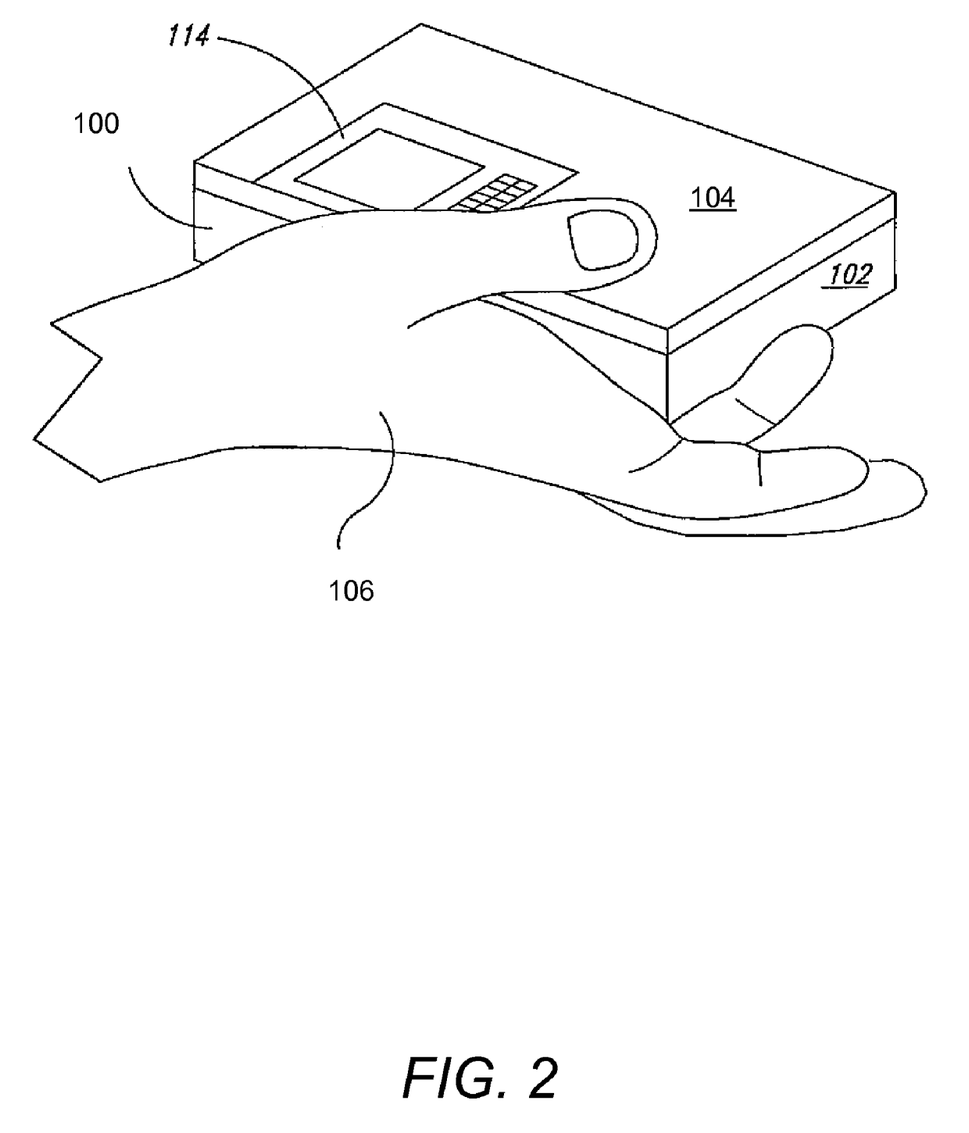
FIG. 2 is a perspective view of the mobile electronic device while closed, with the secondary display visible to the user.

FIGS. 1-2 show an example mobile electronic device, in this case a hand-held portable computer 100 in which an embodiment may be implemented. While the portable computer 100 is used as the illustrative example throughout this application, other embodiments may be implemented with devices that may not necessarily be thought of as a "computer" by the average individual or with devices that may not necessarily have the same portability feature, shape, and/or appearance as the portable computer 100 of FIGS. 1-2. Examples include wireless communication devices, display devices, monitors, stationary desktop computers, audio-video equipment, consumer electronic devices, or other electronic devices that may or may not have a reduced form factor.

As shown, the portable computer 100 is similar in appearance to a laptop computer, in that it comprises first and second portions 102 and 104, respectively. The first portion 102 can include a keyboard 110 and housing for the internal electronic components (such as one or more processors, machine-readable storage media, graphics drivers, and so forth). The second portion 104 folds over the first portion 102 (when in a closed position, such as shown in FIG. 2), and includes a display screen 108 for displaying information (such as an email inbox, emails, downloaded attachments, and/or indicators that indicate the presence of emails, attachments, etc. in an inbox or email folder) while the second portion 104 is unfolded to an upright position as shown in FIG. 1.

Unlike a conventional laptop computer, however, an embodiment of the portable computer 100 is substantially smaller in size in terms of both volume and weight. An example dimensional size of the portable computer 100 is 140 mm long, 101 mm wide, and 30 mm thick (while closed), with a weight of approximately one pound. The display screen 108 on the second portion 104 is of a resolution comparable to a desktop computer monitor. In general, the size of the display screen 108, the size of the internal components (e.g. chips and circuit boards) located within the first portion 102, and the strategic placement of the internal components (e.g. density), and other factors will influence the overall form factor of the portable computer 100. As illustrated in FIGS. 1-2, the portable computer 100 has a size such that it can be held securely in a hand 106 of a user whether in the open or closed position.

FIG. 2 further illustrates an embodiment of the portable computer 100 that has a low-power display 114 positioned on the top surface (lid) of the second portion 104. As described later below, the low-power display 114 can form part of a secondary module for displaying attachment listings or an email inbox, and which provides controls to select an email to read, select an attachment to download, or to perform other operations.

Examples of the portable computer 100 in which embodiments of the UI may be implemented are disclosed in U.S. patent application Ser. No. 10/338,802, entitled "SYSTEM AND METHOD FOR HEAT REMOVAL FROM A HAND-HELD PORTABLE COMPUTER WHILE DOCKED"; U.S. patent application Ser. No. 10/338,815, entitled "NAVIGATION AND SELECTION CONTROL FOR A HAND-HELD PORTABLE COMPUTER"; U.S. patent application Ser. No. 10/338,761, entitled "HEAT DISSIPATION FROM A HAND-HELD PORTABLE COMPUTER"; and U.S. patent application Ser. No. 10/338,791, entitled "KEYBOARD WITH MOUSE FOR A HAND-HELD PORTABLE COMPUTER", all filed Jan. 7, 2003.

Figure 3:
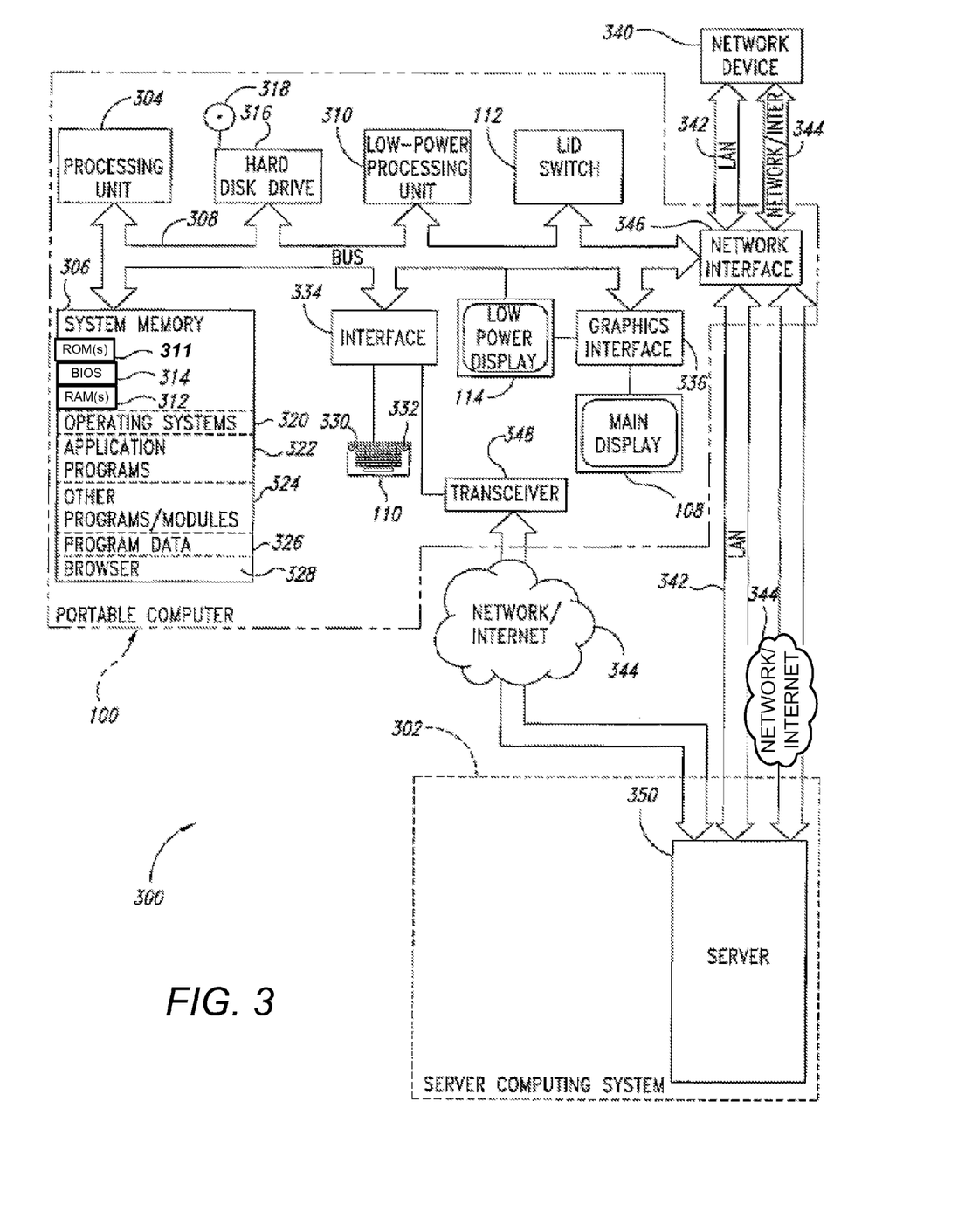
FIG. 3 is a block diagram of the mobile electronic device having a secondary display module, coupled to a network.

FIG. 3 and the accompanying discussion provide a description of a suitable computing environment in which embodiments can be implemented. Although not required, embodiments will be described in the general context of hardware and computer-executable instructions, such as program application modules, objects, drivers, services, or macros being executed by a computer (such as by the portable computer 100). Embodiments can be practiced with other computer systems and/or network configurations as well.

FIG. 3 shows a computing system 300, and in particular shows an embodiment of the portable computer 100 in more detail. The computing system 300 includes the portable computer 100 and a server computing system 302. The server computing system 302 may be located at one or more network locations, for example, at one or more Internet Service Provider (ISP) locations to store and serve email information and to serve other information to the portable computer 100.

The portable computer 100 includes a processing unit 304 for high-power processing, at least one system memory 306, and a system bus 308 that couples various system components, including the system memory 306, to the processing unit 304. The processing unit 304 may be any logic processing unit, such as one or more central processing units (CPUs), digital signal processors (DSPs), graphics processors, application-specific integrated circuits (ASICs), etc.

In an embodiment, the portable computer 100 may also include a low-power processing unit 310 for low power processing, and which may or may not necessarily operate with the same operating system as the processing unit 304. For example, in one embodiment separate operating systems, memory, applications, or other components can be provided for the processing unit 304 and for the low-power processing unit 310. It is also possible in an embodiment for the processing unit 304 and for the low-power processing unit 310 to share certain components, rather than having separate dedicated components.

The system bus 308 can employ any suitable bus structure or architecture, including a memory bus with memory controller, a peripheral bus, and a local bus. The system memory 306 may include one or more read-only memories (ROM(s)) 310 and one or more random access memories (RAM(s)) 312. In one embodiment, separate ROM 310, RAM 312, and/or other memory can be dedicated for the low power display 114. A BIOS 314, for example, which can be stored in the ROM 310, contains routines that help transfer information between elements within the portable computer 100, such as during start-up. Operation of an embodiment of the BIOS 314 in connection with a low power mode will be described in further detail below.

The portable computer 100 may include a hard disk drive 316 for reading from and writing to a hard disk 318. The hard disk drive 316 communicates with the processing unit 304 via the system bus 308. The hard disk drive 316 may include interfaces or controllers (not shown) coupled between the hard disk drive 316 and the bus 308. The hard disk drive 316 and its associated hard disk 318 provide nonvolatile or otherwise persistent storage of computer readable instructions, data structures, program modules and other data for the portable computer 100. Although the depicted portable computer 100 employs the hard disk drive 316 and the hard disk 318, other types of drives and computer-readable media that can store data accessible by a computer may be employed, such as compact disks (CDs), magnetic cassettes, flash memory cards, digital video disks (DVDs), Bernoulli cartridges, RAMs, ROMs, smart cards, etc. In one embodiment, the hard disk drive 316 and/or other drives are not integrated within a housing of the portable computer 100 itself, but instead are external devices that are accessible via hardwire or wireless communication interfaces.

The hard disk drive 316 can operate in conjunction with the hard disk 318 to store media files, such as MP3 files or other types of audio files. In an embodiment, these media files can be read from the hard disk 318 during a full power mode or during the low power mode, where attempts to access the hard disk 318 during the low power mode to read media files are minimized as much as possible during the low power mode.

The system memory 306 can be used for storing various program modules, such as one or more operating systems 320, one or more application programs 322 (such as an email program, the low power media player, an installed media player, or other applications that can operate in a high power mode or in a low power mode), other programs or modules 324, and program data 326. A non-limiting example of an operating system 320 that may be used is Windows XP™ commercially available from Microsoft Corporation of Redmond, Washington. Windows XP™ or other suitable operating systems may include a power management subsystem. An embodiment provides power management capabilities in connection with the low power mode that supplements power management provided by the power management subsystem of the operating systems 320.

The other programs/modules 324 can include libraries, application program interfaces (APIs), objects, or other components. The program data 326 can include cached data, such as cached songs or other media files, in one embodiment. As such, parts of the system memory 306 provide volatile or otherwise non-persistent memory capability, (such as an operating system cache, a RAM 312, or other cache or non-persistent storage location) for storing media files.

The program data 326 can be stored as a data structure, file, or other data format in a cache, database, or other storage unit integrated in or separate from the system memory 306. In one embodiment, the program data 326 also includes power profiles and other power management data indicative of the power requirements of particular services, software, and hardware of the portable computer 100. This power management data is used in one embodiment to determine which component of the portable computer 100 to keep ON or to turn OFF during the low power mode, the length of time to keep the component ON or OFF, the sequence for turning various components ON or OFF, and to determine other parameters and settings. A detailed discussion of the other programs/modules 324 that interact to manage and control the portable computer 400 in the low power mode and the operations of application programs 322 (and more specifically, for managing and controlling the operation of low power mode application programs) is included in pending U.S. patent application Ser. No. 10/857,628 (Pub. No. US2005/0076256), entitled "METHOD AND APPARATUS FOR OPERATING AN ELECTRONIC DEVICE IN A LOW POWER MODE" filed May 28, 2004, which subject matter is hereby incorporated by reference.

The portable computer 100 may also include a web browser 328 for permitting the portable computer 100 to access and exchange data with sources such as Internet web sites, corporate intranets, extranets, and/or other networks as described below, as well as other server applications on server computers. For purposes of clarity the browser 328 is shown separately in FIG. 3. According to various embodiments, the browser 328 can comprise one of the application programs 322, one of the other programs/modules 324, and/or may be integrated in some manner with the operating system(s) 320. While shown in FIG. 3 as being stored in the system memory 306, the operating systems 320, application programs 322, other programs/modules 324, program data 326, and browser 328 can be stored in the hard disk 318 of the hard disk drive 316 and/or other computer-readable media in another embodiment. Moreover, the various elements depicted as being stored in the system memory 306 need not necessarily reside on the same physical memory. For example, in embodiments where the low-power processing unit 310 and the low power display 114 can be operatively detached from the portable computer 100 or otherwise operate independently of other components of the portable computer 100, separate memory (having an operating system, RAM, ROM, applications, and other elements stored thereon) can be operatively decoupled from the portable computer 100 along with the low-power processing unit 310 and the low power display 114. In such an embodiment, the decoupleable components can be integrated in a secondary display module.

A user can enter commands and information into the portable computer 100 through one or more input devices (such as the keyboard 110) and a pointing device (such as a mouse 330 that may be, for example, built into the keyboard 110, an example embodiment of which is disclosed in U.S. patent application Ser. No. 10/338,791), or through such other types of devices usable for providing user input. Alternatively or additionally, the mouse 330 can be embodied as a touch pad as compared to physical buttons. Another input device may take the form of one or more buttons 332 on the side of the keyboard 110, with the button(s) 332 usable for scrolling and clicking via turning and pressing of the button(s) 332. Other possible input devices can include a microphone, joystick, game pad, scanner, etc. (not shown). These and other input devices are connected to the processing unit 304 through an interface 334 such as a serial port interface that couples to the bus 308, although the portable computer 100 may employ other interfaces such as a parallel port, a game port or a wireless interface or a universal serial bus (USB). The interface 334 can be any suitable communication interface to the bus 308 and need not necessarily be a port per se. In one embodiment, the input devices such as a mouse, joystick, game pad, keyboard, etc. are integrated directly into the housing of the portable computer 100, rather than or in addition to being couple-able via a serial or parallel port interface.

The display screen 108 operates as the main display and is coupled to the bus 308 via a graphics interface 336, such as a video adapter or other graphics component that will allow video and other graphics to be rendered on the display screen 108. The low power display 114 (and its associated user interfaces) may also be present in one embodiment to allow presentation of data (e.g. presentation on the outside surface of the second portion 104 of the portable computer 100) during the low power mode, when the lid is closed on the portable computer 100. The low power display 114 may be coupled to the bus 308 by way of the graphics interface 336 (or other interface) or may be directly coupled to the bus 308. The low power display 114 can provide its user interface with various controls, such as buttons and menus, which may be used to control various aspects of applications operating in the low power mode. Also as depicted in FIG. 3, the lid switch 112 can be coupled to the system bus 308 to allow the various components of the portable computer 100 to detect and respond to a closing or opening of the lid of the portable computer 100.

The portable computer 100 can operate in a networked environment using logical connections to one or more remote computers and/or devices external to the portable computer 100, such as the server computing system 302 and a network device 340, such as a printer or network storage unit. The portable computer 100 is logically connected to one or more remote computing systems or devices under any suitable method of permitting computers to communicate, such as through a wireless local area network (WLAN) 342, a wireless wide area network (WWAN), or any other network 344, including wired and wireless networks that use or can communicate with the Internet (e.g. World Wide Web). Various embodiments can be implemented to communicate with several types of communication networks, including but not limited to, telecommunications networks, cellular networks, paging networks, wired and wireless enterprise-wide computer networks, intranets, extranets, the Internet, and other types of networks. Examples of wireless systems and protocols with which the portable computer 100 can communicate, include but are not limited to, WiFi, Bluetooth, IEEE 802.11, and others.

When used in a LAN networking environment, the portable computer 100 can be connected to the LAN 342 through an adapter or network interface 346 (communicatively linked to the bus 308). When used in a WWAN or other network 344, the portable computer 100 may include a modem, transceiver 348 or other device, such as the network interface 346, for establishing communications in this networked environment or for otherwise communicating with external devices. The transceiver 348 as shown in FIG. 3 is communicatively linked between the interface 334 and the network 344. The transceiver 348 may be one or more transmitters, receivers, or other communication devices that are compliant with, for example, IEEE 802.11, GPS, Bluetooth, cellular (TDMA, FDMA, and/or CDMA), WiFi, virtual private network (VPN), and/or other communication standard or technique.

In one embodiment, the portable computer 100 is communicatively linked to the server computing system 302 through the LAN 342 and/or the network 344 with the Transmission Control Protocol/Internet Protocol (TCP/IP) or other network protocols, such as the User Datagram Protocol (UDP). The network connections shown in FIG. 3 are illustrative examples of communication links between computers, and other links can be used, including both hardwire and wireless links.

The server computing system 302 includes one or more servers 350. In the context of email, the server 350 can comprise an email server. An example of such a server is a Microsoft Exchange™ server, and the principles described herein are not to be limited to only email implementations that use a Microsoft Exchange™ server.

Figure 4:
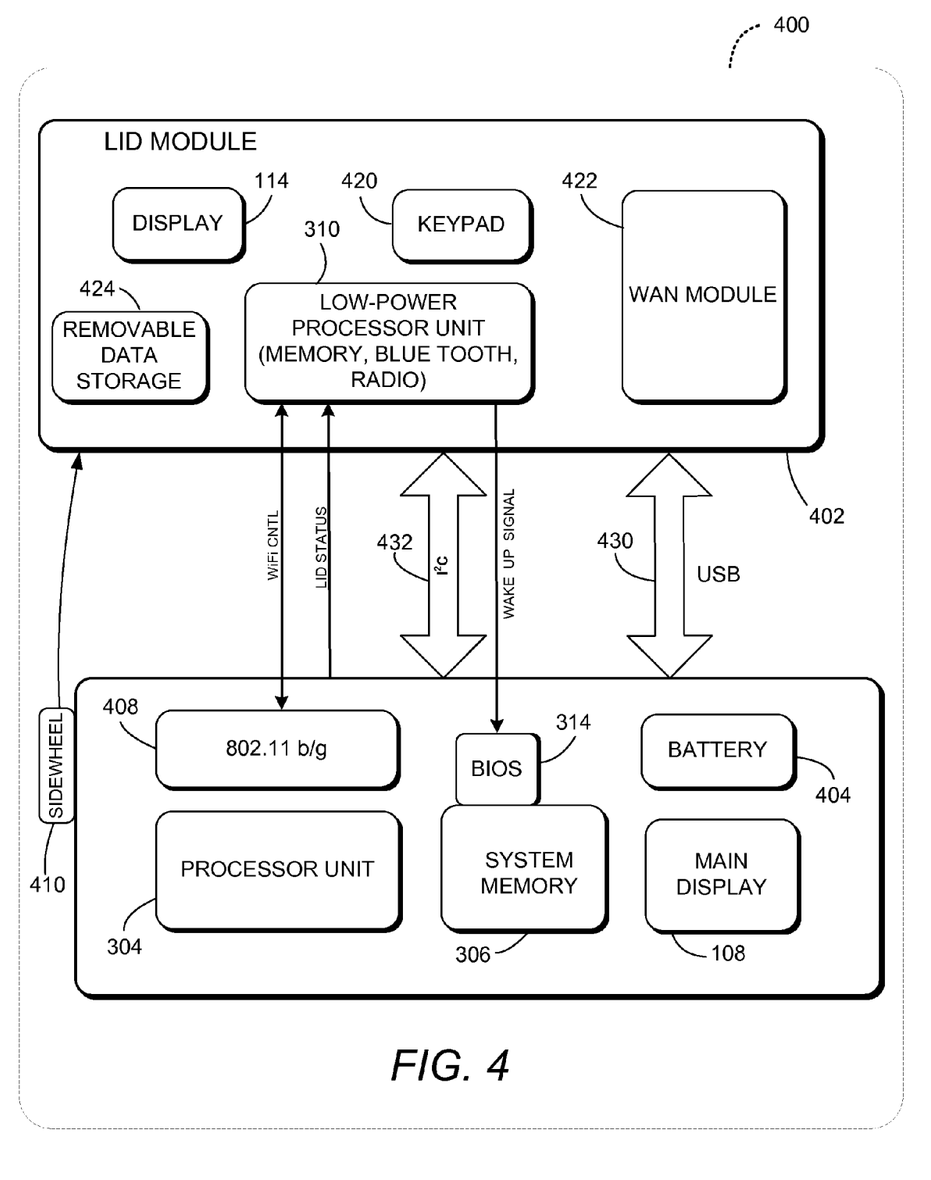
FIG. 4 is a block diagram of a secondary display module that can be detached from the rest of the mobile electronic device.

FIG. 4 illustrates a portable computer 400 in which a secondary display module 402 (referred to in this embodiment as a Low Power Interactive Display module or "LID module") can be detached from the rest of the portable computer 400, according to one embodiment. The portion of the portable computer 400 excluding the LID module 402 is referred to herein as the "main portion" of the portable computer 400. In one embodiment, the LID module 402 is detachably attached to a portion of the portable computer 400 that is similar to the second portion 104 (FIG. 2). In other embodiments, the LID module 402 may be detachably attached to another portion of the portable computer 400. In this embodiment, in addition to the previously described main display 108, processor unit 304, BIOS 314, system memory 306, the main portion of the portable computer 400 includes a battery 404, a wireless network unit 408 and a side wheel 410. In some embodiments, wireless network unit 408 provides functionality for wireless networks that conform to IEEE Standard 802.11b and/or 802.11g. Side wheel 410 is an input device that allows a user to scroll through data being displayed in either main display 108 or low-power display 114 on the LID module 402.

The LID module 402, in this embodiment, includes the previously described low-power processor unit 310, and low-power display 114. In one embodiment, low-power processing unit 310 is an application specific integrated circuit device that includes an embedded ARM7 core (available from ARM Ltd., Cambridge, UK), non-volatile and volatile memory, Bluetooth circuitry and RF circuitry. In some embodiments, low-power processing unit 310 and other circuitry of the LID module 402 can communicate with the rest of the portable computer 400 via one or more universal serial bus (USB) connections such as USB 430. Further, in some embodiments, low-power processing unit 310 can communicate with other circuitry of the rest of portable computer 400 via an Inter-Integrated circuit ($I^2C$) bus 432.

This embodiment of the LID module 402 also includes a keypad 420, a wide area network (WAN) module 422, and removable data storage 424 (e.g. LID module 402 may include a slot for secure data (SD) cards or other removable storage media). The WAN module 422 can include a cellular module and/or a global positioning system (GPS) module for wireless communication of voice and data information. In some embodiments, the LID module 402 can be detached from the main portion of the portable computer 400 so that the WAN module 422 can provide the LID module 402 with standalone cellular telephone and GPS functionalities. In some embodiments, the removable data storage 424 and/or the WAN module 422 may be omitted.

Figure 5:
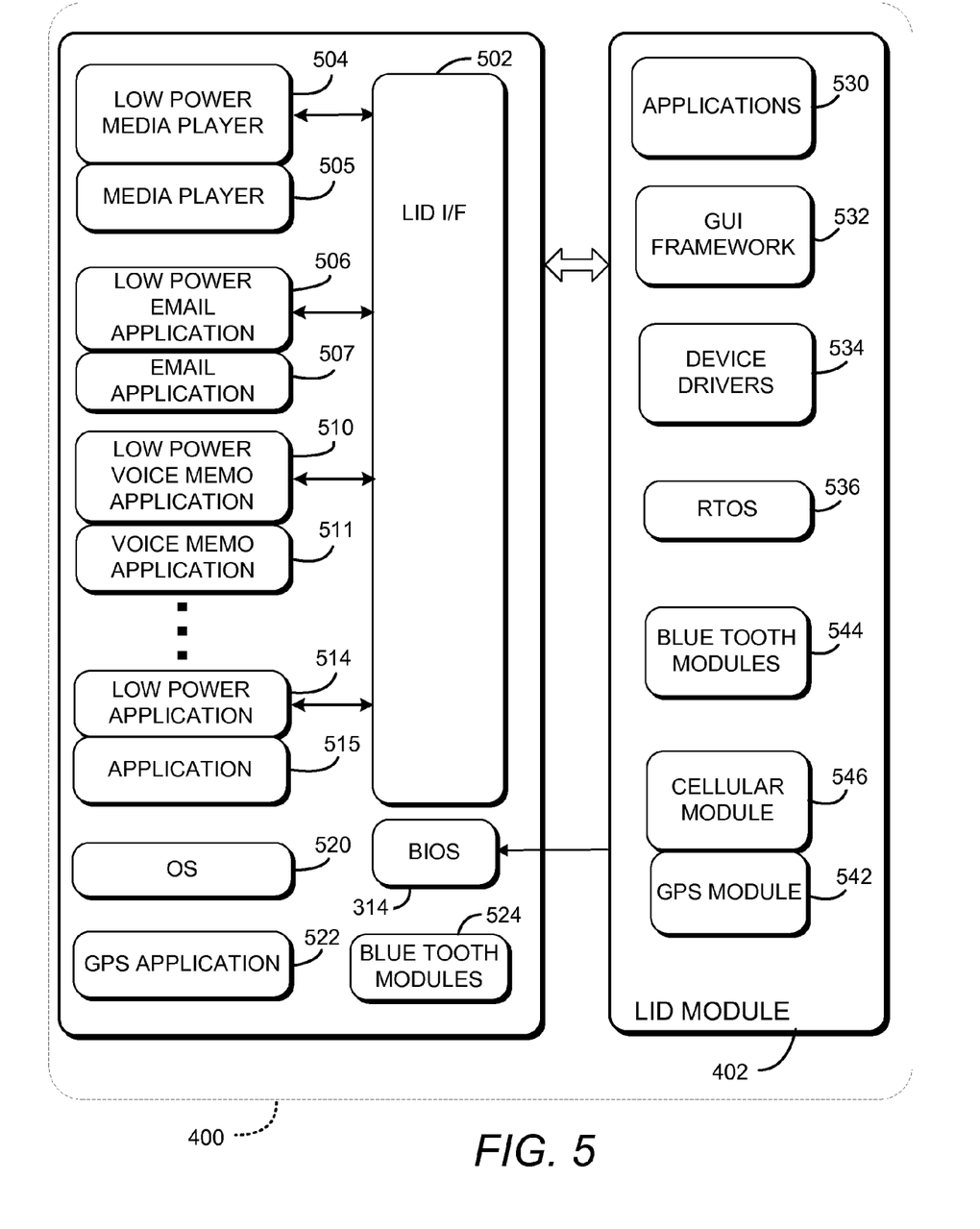
FIG. 5 is a block diagram of software components of the mobile electronic device and the secondary display module.

FIG. 5 is a block diagram of software components of the portable computer 400 and the LID module 402. In this embodiment, the main portion of the portable computer 400 includes a LID interface module 502, which supports a LID module application protocol used to transfer control and data between the portable computer 400 and the LID module 402. In this exemplary embodiment, the portable computer 400 also includes: a low-power media player 504 and an associated "normal" or standard media player 505 (e.g. Windows Media Player available from Microsoft Corp., Redmond, Wash.); a low-power email application 506 and an associated normal email application 507 (e.g. Outlook available from Microsoft); and a low-power voice memo application 510 and an associated normal voice memo application 511. The portable computer 400 can also include one or more other pairs of low-power and "normal" applications such as a low-power application 514 and a normal application 515, as well as an operating system (OS) 520 and the previously described BIOS 314. The OS 520 can be any suitable operating system, such as Microsoft Window, Linux, Mac OS, etc.

The portable computer 400, in this embodiment, also includes a GPS application 522 for displaying GPS information received from a GPS receiver (e.g. a GPS receiver integrated in the WAN module 422 described above in conjunction with FIG. 4), and a Bluetooth module 524 (with Bluetooth profiles and services, protocol stack, and drivers) for supporting wireless communication with other Bluetooth devices (e.g. some models of headphones, keyboards, cellular telephones, personal digital assistants, etc.).

The LID module 402, in this embodiment, includes: applications 530 to be run on the LID module 402; a graphical user interface (GUI) framework 532 to display icons, buttons, information, etc. so that a user can interact with applications 530 and other modules of the LID module 402; device drivers 534; a real time operating system (RTOS) 536 to be executed by low-power processor unit 310 (FIG. 4), a Bluetooth module 544 (which includes profiles, stack, etc. for interacting with Bluetooth-capable devices); a cellular module 546 to operate cellular telephone circuitry of the WAN module 422, and a GPS module 542 to operate GPS circuitry of the WAN module 422. The RTOS 536 can be any type of RTOS suitable for the low-power processor unit 310 (FIG. 3). In an embodiment, real time operating system 536 and operating system 520 can be the one or more operating systems 320 in system memory 306.

Figure 6:
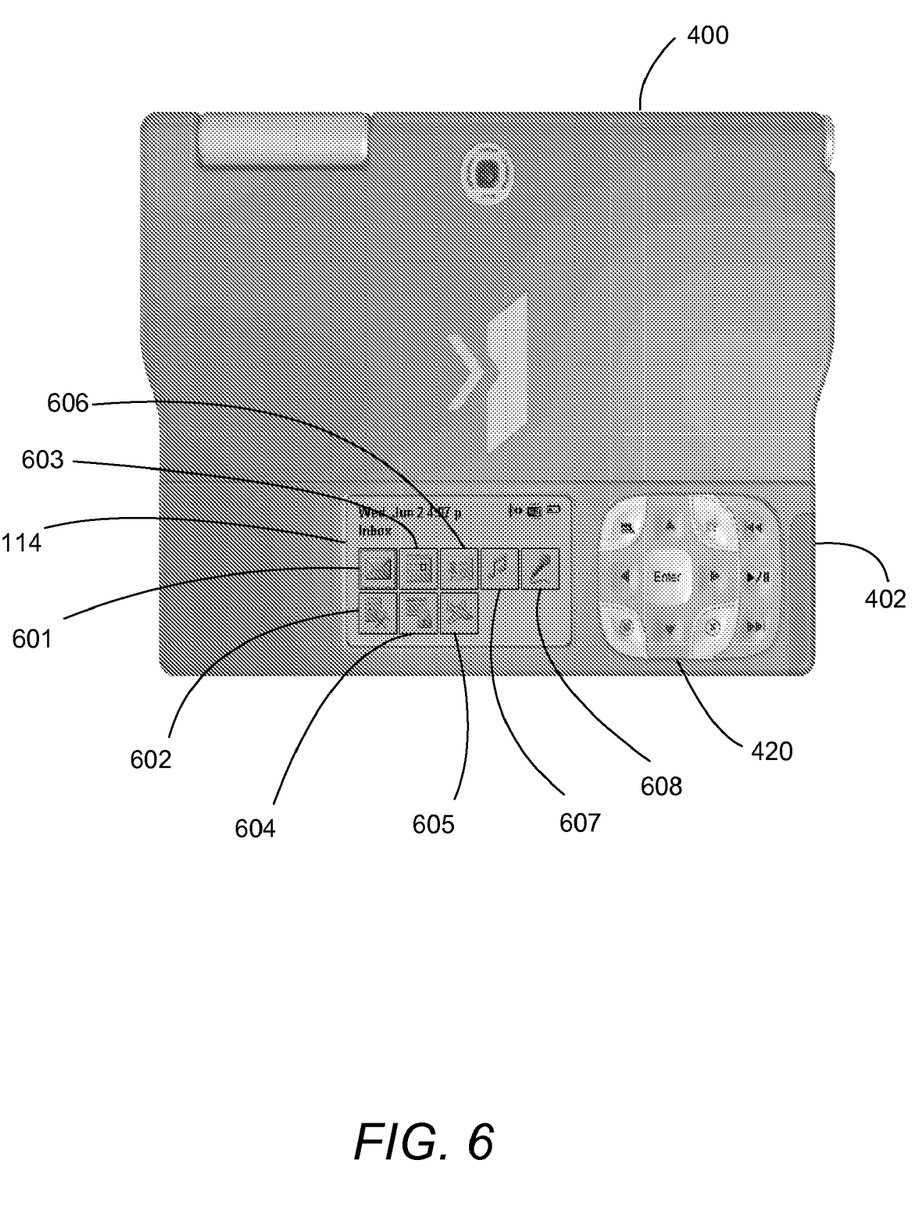
FIG. 6 illustrates an exemplary UI displayed by the secondary display module.

FIG. 6 illustrates an exemplary UI depicted by the low-power display 114 of the LID module 402. In FIG. 6, the LID module 402 is attached to the main portion of portable computer 400, and includes an exemplary keypad 420. In this embodiment, the low-power display 114 depicts the UI, which in turn includes several interactive screens. These screens include a main UI screen, an example of which is shown in FIG. 6. From the main UI screen, a user can navigate to other screens (not shown), such as "feature" screens providing various functions supported by the UI. In this embodiment, the main UI screen has icons and/or touch-sensitive buttons (in embodiments in which low-power display 114 is a touch screen display) 601-608. Icons and touch-sensitive buttons are referred to herein as buttons. Embodiments of these buttons are described below. When a button is activated, the main UI screen transitions to a feature screen for the activated function (e.g. a main email screen, a main calendar screen).

The button 601 is an inbox button for accessing a streamlined set of email features via the LID module 402 without launching the email application 507 (FIG. 5). In one embodiment, if the user only wants to view email information that is cached locally on the LID module 402, then the OS 520 (FIG. 5) is not activated. This operation is described for a general application in conjunction with FIG. 7, below. By avoiding activation of the email application 507 and the OS 520, this feature can enable significant reductions in power dissipation by the portable computer 400.

In one embodiment, activating the inbox button 601 allows the user to selectively check for new messages, read messages in the inbox, delete individual messages, mark messages as read or unread. The main email screen changes to a different screen for each of the above email operations. Additional options may be displayed via a pop-up menu (described further below in conjunction with FIG. 8). In this embodiment, more complex email operations are performed via the main portion of the portable computer 400 and the launching of the email application 507.

Button 602 is a settings button for customizing selected features of the LID module 402. In one embodiment, the settings button 602 can be used to set up security features (e.g. security codes/password, security timer), set up the wireless functions of the LID module 402 (e.g. enable/disable Bluetooth, radio, cellular telephone, WiFi features), change display settings (e.g. backlight timer, font size, contrast, scroll rate, etc.), and change sound settings (e.g. alerts for email, low power warning, etc.).

Button 603 is a calendar button for accessing a streamlined set of calendar features via the LID module 402 without launching a calendar application. For example, the application 514 (FIG. 5) can be a calendar application or part of the email application 507 that includes calendar functions. In this embodiment, the calendar button 603 allows a user to view calendar entries and receive reminders for events entered into the calendar. In one embodiment, the LID module 402 locally caches calendar information for a preselected period of time (e.g. five weeks). From the main calendar screen, a user can view additional screens that display calendar information for a specific month or week or day. The main calendar screen may display buttons that allow the user to scroll through the calendar. These additional screens may also include buttons to allow a user to navigate to other screens showing details of the reminders (e.g. an appointment entered into the calendar).

Button 604 is a lock keypad button for disabling most of the keys of the keypad 420 and the buttons depicted by the low-power display 114 to prevent inadvertent operation of the LID module 402. The LID module 402 can be unlocked by pressing a preselected sequence of keys of the keypad 420. In one embodiment, a user can select an option requiring a security code or password to be entered before the LID module 402 can be unlocked.

Button 605 is a wireless on/off (flight mode) button for turning wireless radios (e.g. Bluetooth features, WiFi features, cellular telephone features, etc.) on and off. This feature can be advantageously used during a flight on an airplane (which typically prohibits such radio activity for the duration of the flight). This feature provides a quick and easy method to ensure that the prohibited radio features are turned off, even while the user is using other (non-radio) features of the portable computer 400.

Button 606 is a contacts button for accessing a streamlined set of contact features via the LID module 402 without launching a contacts application. For example, the application 514 (FIG. 5) can be a contacts application or part of the email application 507 that includes contact functions. In this embodiment, the contacts button 606 allows a user to find and view contact entries by entering the first few letters of the contact's name via buttons displayed from the contacts main screen. The main contacts screen may also display buttons that allow the user to select how the contacts will be displayed (e.g. sorted by first or last name, company, phone number, etc.). The screen displaying the contacts may also include buttons that allow the user to navigate to other screens displaying more detailed contact information about the contact.

Button 607 is an audio player button for accessing a streamlined set of audio player features via the LID module 402 without launching the media player application 505. In this embodiment, the audio player button 607 allows a user to browse and play audio files. From the main audio player screen, a user can navigate through a series of screens to find particular audio tracks or files. In one embodiment, when the audio player button 607 is activated, the LID module 402 displays an audio library screen with buttons that allow the user to browse the library. For example, the audio library screen may include buttons for browsing by artists, albums, genres, tracks, user-defined play lists, all tracks, etc. After selecting a browsing method, the LID module displays a screen showing the artists, albums, genres etc. with buttons that allow the user to scroll or navigate through the displayed artists, albums, etc. The user can then select an artist, album etc., which causes the LID module to display the tracks associated with the selection. The user can then activate a "play" button displayed on the screen to play the tracks. In some embodiments, the user may navigate to additional screens that display track information such as title, artist, composer, album, track size (in KB or MB), duration, bit-rate, etc. In some embodiments, the user may also navigate to additional screens that allow the user to change settings on the audio player (e.g. volume, repeat, shuffle, etc.).

Button 608 is a voice memo button for accessing a streamlined set of voice memo features via the LID module 402, without launching the voice memo application 511. In this embodiment, the voice memo button 608 allows a user to record and play voice memos through the LID module 402. In one embodiment, if there are no voice memos stored in the LID module 402, activating the voice memo button 608 causes a "record memo" screen to be displayed. If there are stored voice memos, a "display memos" screen is displayed instead.

In one embodiment, the "record memo" screen displays buttons that allow a user to start, pause and stop recording. This screen may also display the duration of the memo as it is being recorded. When the stop button is activated, the LID module 402 automatically displays the "display memos" screen, in one embodiment.

The "display memos" screen lists all of the stored voice memos, and buttons for playing and deleting the displayed memos. This screen may also include a button for recording new memos, which causes the LID module 402 to display the aforementioned "record memo" screen. When the user activates the play button, the LID module displays play, pause and stop buttons, and a graphic that shows the remaining duration of the memo.

Figure 7:
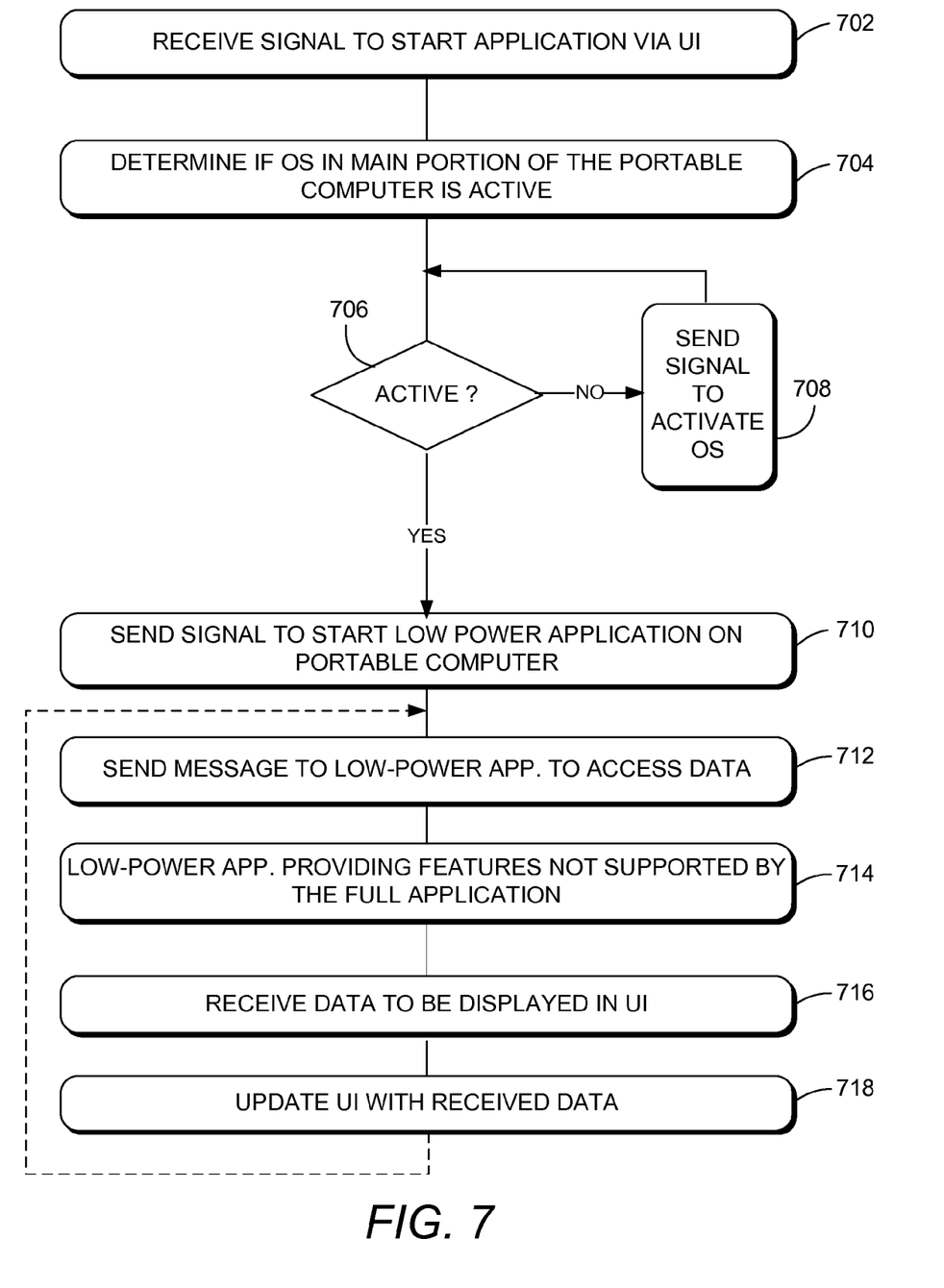
FIG. 7 is a flow diagram illustrating operation flow of the secondary display module in starting an application on the mobile electronic device.

FIG. 7 is a flow diagram illustrating operation flow of the LID module 402 (FIG. 5) in starting an application residing in the main portion of the portable computer 400 (FIG. 5). In one embodiment, these operations will be initiated when the LID module 402 accesses information that resides in the main portion of the portable computer 400 (e.g. the information is not cached in the LID module 402) in response to the user activating a button on the main UI screen (e.g., see the main UI screen shown in FIG. 6) of the LID module 402.

Referring to FIGS. 5 and 7, in a block 702, LID module 402 receives a signal to start an application. In this embodiment, the LID module 402 can receive such a signal when the user activates a button displayed from the main UI screen (FIG. 6). For example, if the user activates the inbox button 601, the GUI framework 532 of the LID module 402 receives a signal to start an email application on the main portion of the portable computer 400.

In block 704, the LID module 402 determines whether the OS 520 of the main portion of the portable computer 400 is active. If in a decision block 706 the LID module 402 determines that the OS 520 is not active, the operation flow proceeds to a block 708 in which the LID module 402 sends a wake-up signal to the main portion of the portable computer 400. In one embodiment, the low-power processing unit 310 (FIG. 4) sends the wake up signal to the BIOS 314 of the main portion of the portable computer 400, bypassing the LID interface module 502. The main portion of the portable computer 400 can then send a message to the LID module 402 that the OS 520 is active, via the LID interface module 502. The operational flow then returns to block 706. If in block 706 the LID module 402 determines that the OS 520 is active, then operational flow proceeds to a block 710.

In a block 710, the LID module 402 sends a start application signal or message to the main portion of the portable computer 400 via the LID interface module 502. In this embodiment, the LID interface module 502 causes the low-power application 514 associated with the "full" application to start, leaving the full application unlaunched. As previously described, this feature allows the LID module 402 to reduce the power dissipation of the portable computer 400 and to provide the low power application 514 with access to associated data while still providing one or more of the features of the "full" application. The low-power application 514 typically provides a subset of the features provided by the corresponding full application, but in some embodiments the low-power application 514 may provide feature(s) that are not supported by the full application. Continuing the email example described in conjunction with the block 702, the low-power email application 506 would be started without launching the email application 507, as disclosed in pending U.S. patent application Ser. No. 10/871,870 (Pub. No. US2005/0066006), entitled "LOW POWER EMAIL FUNCTIONALITY FOR AN ELECTRONIC DEVICE" filed Jun. 17, 2004 and incorporated herein by reference.

In a block 712, when the low-power application 506 is ready, the LID module 402 sends a message with a command (e.g. request for data) to the low-power application via the LID interface module 502. For example, the main portion of the portable computer 400 may send a message indicating the low-power application is ready/not ready for the next message or command. The LID module 402 can then send message(s) in response to the user's activation of buttons depicted on feature screens of the UI (described above in conjunction with FIG. 6).

In a block 714, the low power application 514 may provide features that are not supported by the full application. For instance, the low power application 514 may provide one or more features that are not supported by its associated full application in addition to the corresponding low power application 514 being accessible on the secondary display module 402 and being accessible without engaging the OS 320 of the main logic processor unit 304.

In a block 716, the LID module 402 then receives data to be displayed in the UI (e.g. in one of the feature" screens of the application described above in conjunction with FIG. 6) via the LID interface module 502.

In a block 718, the LID module 402 then updates the UI depicted in the low-power display 114 (FIG. 4) with the data received from the main portion of the portable computer 400 in response to the message sent in the block 716. In this embodiment, the GUI framework 532 handles display of the received data in the UI. Operational flow can then return to the block 712 until the user terminates the session.

Figure 8:
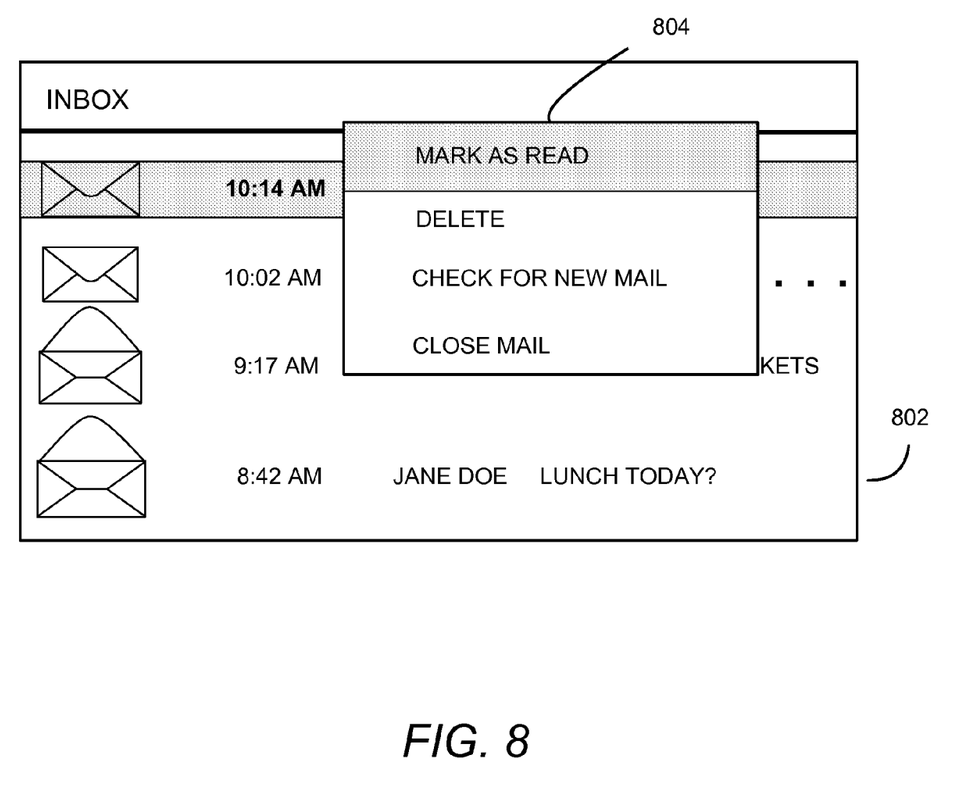
FIG. 8 illustrates an exemplary pop-up menu displayed in the UI of the secondary display module.

FIG. 8 illustrates an exemplary pop-up menu displayed in the UI of the LID module 402, according to one embodiment. In this example, the LID module 402 displays a main email screen 802 (described above in conjunction with FIG. 6) when the inbox button 601 is activated. When the user selects a particular email message (e.g. the highlighting of the first email message indicates that it is selected), a pop-up menu 804 is displayed. This pop-up menu allows the user to select one of several possible operations to be performed (e.g. delete, mark as read, etc.). Although an email example is shown, pop-up menus can be used with other features that can be activated from the main screen of the UI.

Figure 9:
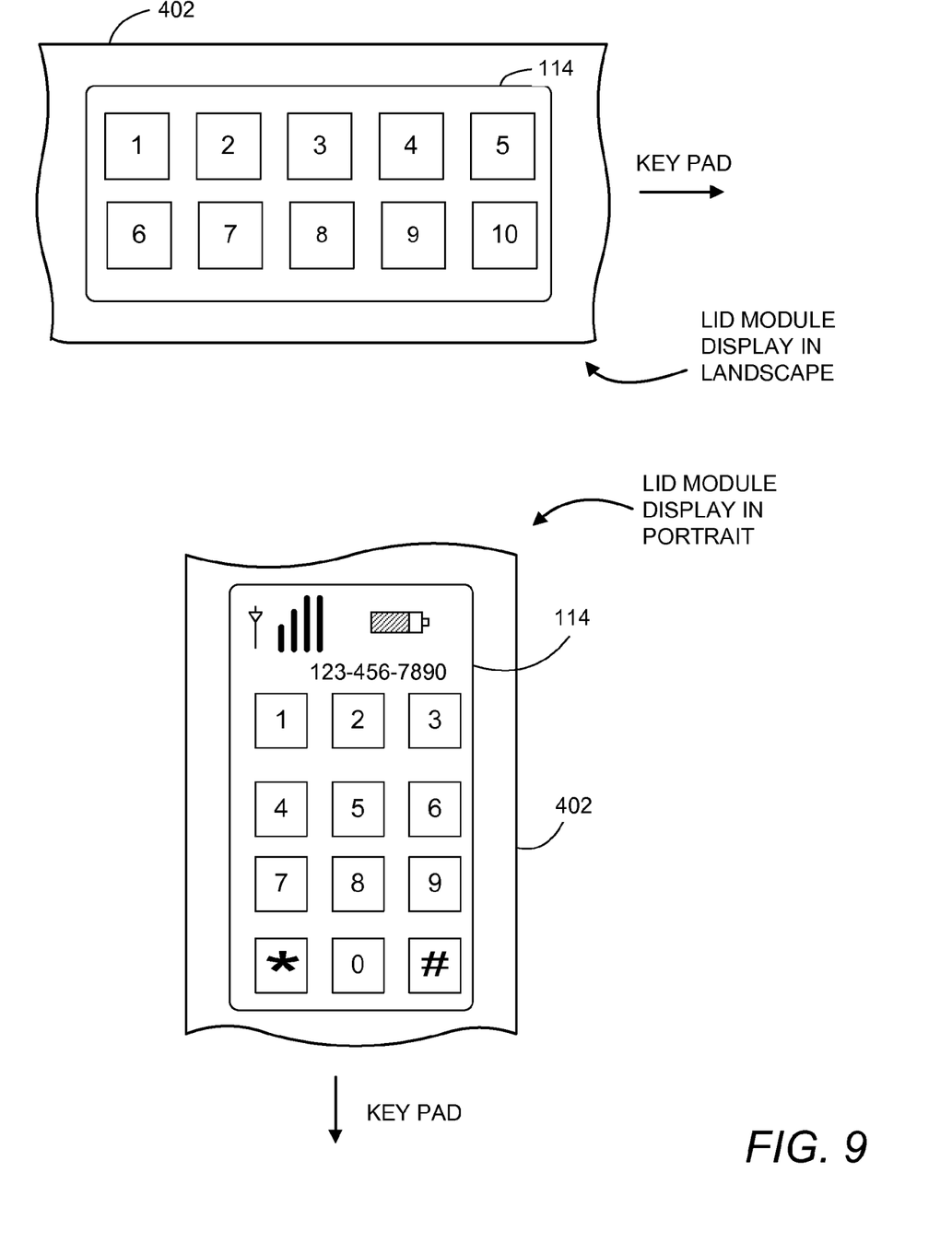
FIG. 9 illustrates reorientation of the UI displayed by the secondary display module, all according to various embodiments.

FIG. 9 illustrates reorientation of the UI displayed by the LID module 402 when detached from the main portion of the portable computer 400, according to one embodiment. In this embodiment, when the LID module 402 is attached, the UI is oriented so that the displayed buttons are in a "landscape" orientation (i.e., with the top of the buttons oriented toward one of the long sides of the LID module 402. This landscape orientation is shown in FIG. 6. When the LID module 402 is detached from the main portion of the portable computer 400, the UI is automatically reoriented into a "portrait" orientation (i.e., with the top of the buttons oriented toward one of the short sides of the LID module 402). In one embodiment, the portrait orientation has the keypad 420 located below the low-power display 114. This feature causes the LID module 402 to have a configuration similar to typical cellular telephones (i.e., with the keypad below the LCD display).

In other embodiments, a user may selectively reorient the UI displayed by LID module 402. For example, when using one of the cellular telephone features of the LID module 402, the LID module 402 may be configured to automatically reorient the UI into the portrait orientation even if the LID module 402 is attached to the main portion of the portable computer 400. In some other embodiments, the LID module 402 may include a component that can sense the orientation of the LID module 402 (e.g., the orientation of the LID module 402 relative to the direction of the force of gravity) and, in response to changes in orientation, automatically adjust the orientation the UI with the LID module 402.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on some form of computer readable media. Computer readable media can be any media that can be accessed by a computer. By way of example, and not limitation, computer readable media may comprise "computer readable storage media."

"Computer readable storage media" includes volatile and non-volatile, removable and non-removable media implemented in any method or technology for storage of information such as computer readable instructions, data structures, program modules, or other data. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any medium which can be used to store the desired information and which can be accessed by a computer.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A user interface (UI) for depiction by a display of a secondary display module of a mobile electronic device, the secondary display module having a secondary logic processor unit coupled with an input device and configured to support functions of the secondary display module, the mobile electronic device having a main display, a memory and a main logic processor unit external to the secondary display module, both the main logic processor unit and secondary logic processor unit being coupled via a common system bus with the input device and having an operating system (OS), the UI comprising:

a plurality of buttons graphically depicted by the display of the secondary display module, the plurality of buttons corresponding to a plurality of applications that can be selectively started on the mobile electronic device with the main logic processor unit, and at least one of the plurality of applications being stored in the memory and having a corresponding low power application and data that are disposed in the memory on the mobile electronic device and can be selectively accessed on the mobile electronic device with the secondary logic processor unit disposed on the secondary display module, the corresponding low power application providing one or more features that are not supported by the at least one of the plurality of applications in addition to the corresponding low power application being accessible on the secondary display module and being accessible without engaging the OS of the main logic processor unit, wherein activation of a button of the plurality of buttons, using the input device that is coupled with the main logic processor unit and secondary logic processor unit via the common system bus such that the main logic processor unit and secondary logic processor unit can directly receive signals from the input device, selectively allows a user to:

1) with the secondary logic processor unit, access data of the application in the memory corresponding to the activated button using the corresponding low power application without engaging the OS of the main logic processor unit and without engaging the one of the plurality of applications, and 2) activate the OS of the main logic processor unit and the low-power application associated with the one of the plurality of applications corresponding to the activated button.

2. The UI of claim 1 wherein the plurality of buttons includes a button corresponding to an application to disable all wireless communication components included in the mobile electronic device in response to activation by a user.

3. The UI of claim 1 wherein a UI of the secondary display is automatically activated in response to the secondary display module being detached from the mobile electronic device while the main display continues to operate.

4. The UI of claim 1 wherein orientation of the UI is automatically changed in response to the secondary display module being detached from the mobile electronic device.

5. The UI of claim 1 wherein orientation of the UI automatically changes in response to a change in physical orientation of the secondary display module.

6. The user interface as recited in claim 1 wherein the main logic processor unit and the secondary logic processor unit are coupled with the display, the secondary display and a memory comprising the low-power application and the OS.

7. The UI of claim 1 wherein the corresponding low power application includes a reduced set of features of the one of the plurality of applications.

8. The UI of claim 1 wherein the secondary logic processor unit requires less power to operate than the main logic processor unit.

9. The UI of claim 1 wherein activation of a button of the plurality of buttons, using the input device, further allows a user to:

1) access data of the application in the memory corresponding to the activated button without engaging the OS of the secondary logic processor unit and the one of the plurality of low power applications; and 2) activate the OS of the main logic processor unit and the one of the plurality of applications corresponding to the activated button.

10. The UI of claim 1, wherein the input device comprises a sensor that detects a user contacting the plurality of buttons on the display.

11. The UI of claim 1, wherein the low power application that is disposed in the memory on the mobile electronic device can be selectively executed with the main logic processor unit and the secondary logic processor unit while residing in the memory.

12. A method to be performed by a secondary display module of a mobile electronic device, the secondary display module having a secondary logic processor unit coupled with an input device and configured to support functions of the secondary display module, the mobile electronic device having a main display, a memory and a main logic processor unit external to the secondary display unit, the main logic processor unit being coupled with the secondary logic processor unit via the system bus and the input device such that the main logic processor unit and secondary logic processor unit can directly receive signals from the input device, the main logic processor unit and the secondary logic processor unit each having an operating system (OS), the method comprising:

depicting a user interface (UI) having a plurality of buttons on a display of the secondary display module, wherein the plurality of buttons correspond to a plurality of applications that can be selectively started on the mobile electronic device with the main logic processor unit, and at least one of the plurality of applications being stored in the memory and having a corresponding low power application and data that are disposed in the memory on the mobile electronic device and that can be selectively accessed on the mobile electronic device with the secondary logic processor unit disposed on the secondary display module, the corresponding low power application providing one or more features that are not supported by the at least one of the plurality of applications in addition to the corresponding low power application being accessible on the secondary display module and being accessible without engaging the OS of the main logic processor unit; and     accessing data associated with an application residing on the mobile electronic device and external to the secondary display module by using the corresponding low power application in response to activation of a button of the plurality of buttons using the input device that is coupled with and directly accessible by the main logic processor unit and the secondary logic processor unit without engaging the OS of the main logic processor unit and the one of the plurality of applications, and selectively activating the OS of the main logic processor unit and the low-power application associated with one of the plurality of applications corresponding to the activated button.

13. The method of claim 12 wherein the plurality of buttons includes a button corresponding to an application to disable all wireless communication components included in the mobile electronic device in response to activation by a user.

14. The method of claim 13 wherein other components of the mobile electronic device are selectively operating while the wireless communication components of the mobile electronic device are disabled.

15. The method of claim 12 further comprising automatically activating the UI of the secondary display in response to the secondary display module being detached from the mobile electronic device while the main display continues to display the data.

16. The method of claim 12 further comprising changing an orientation of the UI within the secondary display module.

17. The method of claim 16 further comprising automatically changing an orientation of the UI in response to a change in orientation of the secondary display module.

18. The method of claim 16 further comprising automatically changing an orientation of the UI in response to the secondary display module being detached from the mobile electronic device.

19. The method of claim 12 further comprising automatically deactivating the UI of the secondary display module in response to the main display of the mobile electronic device being activated.

20. The method of claim 12 further comprising automatically activating the UI of the secondary display module in response to the main display of the mobile electronic device being deactivated.

21. A non-transitory computer readable storage media having instructions to be performed by a secondary display module of a mobile electronic device, the secondary display module having a secondary logic processor unit coupled with an input device and configured to support functions of the secondary display module, the mobile electronic device having a main display, a memory and a main logic processor unit external to the secondary display module, the main logic processor unit being coupled with the input device and having an operating system (OS), the input device being directly accessible by the main logic processor unit and the secondary logic processor unit, wherein the instructions when performed by the secondary display module cause the secondary display module to perform operations comprising:

depicting a user interface (UI) having a plurality of buttons on a display of the secondary display module, wherein the plurality of buttons correspond to a plurality of applications that can be selectively started on the mobile electronic device, the plurality of applications having at least one corresponding low power application and data that are disposed in the memory on the mobile electronic device, the at least one corresponding low power application providing one or more features that are not supported by the plurality of applications in addition to the at least one corresponding low power application being accessible on the secondary display module and being accessible without engaging the OS of the main logic processor unit; accessing data associated with an application residing on the mobile electronic device and external to the secondary display module by using the at least one corresponding low power application in response to activation of a button of the plurality of buttons using the input device that is directly accessible by the main logic processor unit and the secondary logic processor unit without engaging the OS of the main logic processor unit; and in response to activation of the button using the input device, selectively activating the OS of the main logic processor unit and the at least one low-power application in the memory and associated with the application corresponding to the activated button without engaging the corresponding application.

22. The non-transitory computer readable storage media of claim 21 wherein the plurality of buttons includes a button corresponding to an application to disable all wireless communication components included in the mobile electronic device in response to activation by a user.

23. The non-transitory computer readable storage media of claim 22 wherein other components of the mobile electronic device are selectively operating while the wireless communication components of the mobile electronic device are disabled.

24. The non-transitory computer readable storage media of claim 21 wherein the operations further comprise automatically activating the UI in response to the secondary display module being detached from the mobile electronic device.

25. The non-transitory computer readable storage media of claim 21 wherein the operations further comprise selectively changing an orientation of the UI within the secondary display module.

26. The non-transitory computer readable storage media of claim 25 wherein the operations further comprise automatically changing an orientation of the UI in response to a change in orientation of the secondary display module.

27. The non-transitory computer readable storage media of claim 25 wherein the operations further comprise automatically changing an orientation of the UI in response to the secondary display module being detached from the mobile electronic device.

28. The non-transitory computer readable storage media of claim 21 wherein the operations further comprise automatically deactivating the UI of the secondary display module in response to the main display of the mobile electronic device being activated.

29. The non-transitory computer readable storage media of claim 21 wherein the operations further comprise automatically activating the UI of the secondary display module in response to the main display of the mobile electronic device being deactivated.

30. A system, comprising:
a mobile electronic device having a secondary display module, a memory, a main display and a main logic processor unit disposed external to the secondary display module, the secondary display module coupled with a secondary logic processor unit and an input device, the secondary logic processor unit being configured to support functions of the secondary display module, the main logic processor unit being coupled with the input device and having an operating system (OS), the main logic processor unit and the secondary logic processor unit each being operative to directly receive signals from the input device, wherein the secondary display module further comprises:
means for displaying a plurality of buttons that correspond to a plurality of applications and associated low power applications stored in the memory that can be selectively started on the mobile electronic device, each associated low power application providing one or more features that are not supported by one of the plurality of applications in addition to each associated low power application being accessible on the secondary display module and being accessible without engaging the OS of the main logic processor unit; and
means for selectively accessing in the memory data associated with an application residing on the mobile electronic device unit using an associated low power application in response to activation of a button of the plurality of buttons using the input device without engaging the OS of the main logic processor unit, and for selectively activating the OS of the main logic processor unit and the low-power application stored in the memory and associated with one of the plurality of applications corresponding to the activated button without engaging the corresponding one of the plurality of applications.

31. The system of claim 30 wherein the means for displaying includes a button corresponding to an application for disabling all wireless communication components included in the mobile electronic device in response to activation by a user.

32. The system of claim 31 wherein other components of the mobile electronic device are selectively operating while the wireless communication components of the mobile electronic device are disabled.

33. The system of claim 30 further comprising means for automatically activating the means for displaying in response to the secondary display module being detached from the mobile electronic device.

34. The system of claim 30 further comprising means for selectively changing an orientation of the means for displaying within the secondary display module.

35. The system of claim 34 wherein the means for selectively changing an orientation automatically changes the orientation of the means for displaying in response to the secondary display module being detached from the mobile electronic device.

36. The system of claim 30 further comprising means for automatically deactivating the means for displaying in response to the main display of the mobile electronic device being activated.

37. The system of claim 30 further comprising means for automatically activating the means for displaying in response to the main display of the mobile electronic device being deactivated.

38. A mobile electronic device, comprising:
a first portion having a main display;
a second portion, articulably attached to the first portion, having a memory and having a main logic processor unit to execute an operating system (OS) and coupled with and operative to receive signals from an input device, wherein the first and second portions can be relatively positioned so that the second portion covers the main display; and
a secondary display module, coupled with the second portion, having a second display to graphically depict a user interface (UI), wherein the UI includes a plurality of buttons corresponding to a plurality of applications that can be selectively started on the second portion and at least one lower power application in the memory and associated with the one of the applications, the associated low power application providing one or more features that are not supported by the one of the applications in addition to the associated low power application being accessible on the secondary display module and being accessible without engaging the OS of the main logic processor unit, wherein a button of the plurality of buttons can be activated with the input device to selectively allow a user to: (1) access in the memory data of the application corresponding to the activated button by using a lower power application associated with the application corresponding to the activated button without engaging the OS of the main logic processor unit, (2) activate the OS of the main logic processor unit and the low-power application in the memory and associated with the application corresponding to the activated button without engaging the corresponding application and (3) activate the OS of the main logic processor unit and the application in the memory corresponding to the activated button.

39. The mobile electronic device of claim 38 wherein the plurality of buttons includes a button corresponding to an application to disable all wireless communication components included in the mobile electronic device in response to activation by a user.

40. The mobile electronic device of claim 38 wherein the UI is automatically activated in response to the secondary display module being detached from the second portion.

41. The mobile electronic device of claim 40 wherein orientation of the UI automatically changes in response to the secondary display module being detached from the mobile electronic device.

42. The mobile electronic device of claim 38 wherein the UI of the secondary display module is automatically deactivated in response to the main display being activated.

43. The mobile electronic device of claim 38 wherein the UI of the secondary display module is automatically activated in response to the main display being deactivated.

* * * * *